United States Patent [19]

Still et al.

[11] Patent Number: 4,970,275

[45] Date of Patent: Nov. 13, 1990

[54] ELASTOMERIC POLYMERS

[75] Inventors: Richard H. Still, Disley; Stanley R. K. Dawber, Cheadle Hulme; Raymond Peters, Wilmslow; Tahir H. Shah, Manchester; Nigel W. Hayman; John R. Wright, both of Cheltenham; Roger I. Hancock, Stockton-on-Tees; Kenneth M. Jones, Knaresborough, all of England

[73] Assignee: Imperial Chemical Industries PLC, London, England

[21] Appl. No.: 386,982

[22] Filed: Jul. 31, 1989

Related U.S. Application Data

[62] Division of Ser. No. 265,504, Nov. 1, 1988.

[30] Foreign Application Priority Data

Nov. 4, 1987 [GB] United Kingdom ................ 8725838

[51] Int. Cl.$^5$ ............................................. C08F 20/00
[52] U.S. Cl. .................................... 525/437; 525/444; 528/272; 528/297; 528/300; 528/308; 528/308.1; 264/176.1
[58] Field of Search ............... 528/272, 297, 300, 308, 528/308.1, 176; 264/176.1; 525/437, 444

[56] References Cited

U.S. PATENT DOCUMENTS

| | | |
|---|---|---|
| 3,945,876 | 3/1976 | Bianca ............................... 428/423.3 |
| 4,212,791 | 7/1980 | Avery et al. ........................ 524/539 |
| 4,262,114 | 4/1981 | Wagener et al. .................... 528/301 |
| 4,467,595 | 8/1984 | Kramers .............................. 57/225 |
| 4,562,232 | 12/1985 | Smith ............................... 525/444.5 |
| 4,581,420 | 4/1986 | Smit .................................. 525/437 |
| 4,663,399 | 5/1987 | Peters ................................ 525/462 |

FOREIGN PATENT DOCUMENTS

| | | |
|---|---|---|
| 53-099296 | 2/1977 | Japan . |
| 57-154412 | 9/1982 | Japan . |
| 58-18412 | 2/1983 | Japan . |
| 60-075627 | 4/1985 | Japan . |

OTHER PUBLICATIONS

Charch et al, Textile Research Journal, 29:536–540 (1959).

Primary Examiner—John Kight, III
Assistant Examiner—S. A. Acquah
Attorney, Agent, or Firm—Cushman, Darby & Cushman

[57] ABSTRACT

Elastomeric block co-polyesters having improved elastic and work recovery properties, a high melting point and are stable at high temperatures, have hard segments comprising at least 50 mole percent of polyethylene terephthalate groups and soft segments comprising at least 40 weight percent of the block copolyester. The soft segments, which have a defined structure, are formed by reacting phenolic compounds with a mixture of ethylene oxide and propylene oxide/butylene oxide.

4 Claims, No Drawings

ELASTOMERIC POLYMERS

This is a division of application 07/265,504, filed Nov. 1, 1988.

This invention relates to elastomeric block copolyesters having improved properties.

It is well known that elastomeric articles such as fibres and tapes may be formed by melt extruding block copolyesters comprising "hard" segments of crystallisable polyester units and "soft" segments of amorphous units. Soft segments formed from high molecular weight poly(oxyalkylene) glycols, e.g. those derived from ethylene oxide, propylene oxide, and butylene oxide, have been shown to be quite effective. It is known from U.S. Pat. No 4 467 595 that the introduction into the poly(oxyalkylene) chain of a "foreign repeat unit" which is greatly different from poly(oxyalkylene) disrupts the chain regularity, so reducing the chance of crystallisation of the soft segment, thereby allowing the use of high molecular weight polyglycols as soft segment. The use of a higher molecular weight soft segment gives rise to several advantages, including raising the melting point of the block copolymer, higher tenacity, and improved elastomeric performance. The "foreign repeat unit" of the soft segments are derived from heterocyclic, nitrogen-containing compounds, e.g. derivatives of hydantoin, oxadiazole, thiadiazole, imidazole and hypoxanthine.

Japanese Pat. No. 58-18412 discloses an elastomeric block copolyester fibre having improved heat resistance. The soft segments of this polyester are formed from polymers prepared by condensing an alkylene oxide with a bisphenol to give a product having an average molecular weight between 800 and 20,000 and in which the mean number of bisphenol units is between 2 and 20. The block copolyesters comprise between 3 and 60% by weight of the polyalkylene oxide.

The elastomeric block copolyesters disclosed in Japanese Pat. No. 58-18412 are not entirely satisfactory for the production of commercially acceptable products such as cushions, mouldings, gaskets, fibres and tapes.

We have found that improved products can be obtained from elastomeric block copolyesters in which the soft segments each comprise a single bisphenol group onto which is condensed a combination of ethylene oxide and propylene oxide and/or butylene oxide. In particular we have been able to produce elastomeric fibres and tapes which have a high melting point (i.e. above 200° C.), are stable at high temperatures and, above all, have good elastic and work recovery properties.

Therefore, according to one aspect of the present invention there is provided an elastomeric block copolyester comprising hard and soft segments, characterised in that the hard segments comprise at least 50 mole percent of polyethylene terephthalate groups, and the soft segments, comprise at least 40 weight percent of the block co-polyester and have the structure

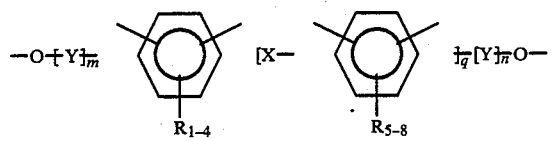

where (i) X represents a direct link between the phenyl groups,

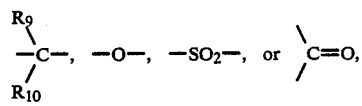

(ii) Y represents a combination of —[—CH$_2$—CH$_2$—O—]—(I) with

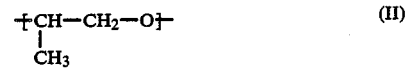

and/or

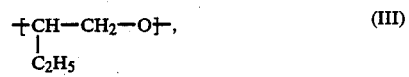

the ratio of (I) to (II) + (III) being within the range 10:1 and 1:20, (iii) m and n each represent an integer, the sum of which corresponds to the segment having a molecular weight of 500 to 10,000, (iv) R$_{1-8}$ each represent —H, —CH$_3$, —C$_2$H$_5$, or —C$_3$H$_7$, (v) R$_{9-10}$ each represent —H, —CH$_3$ —C$_2$H$_5$, —C$_3$H$_7$,

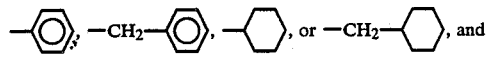

(vi) q represents an integer selected from 0, 1, 2 and 3.

For elastomeric block copolymers which are to be converted into fibres, it is preferable that the soft segments should comprise at least 50, and preferably at least 60 weight percent of the copolyester. However the soft segments may comprise up to 70 to 75 weight percent of the copolyester. For those copolymers which are to be converted into tapes, it is preferable that the soft segments should comprise at least 50, and preferably about 65 weight percent of the copolyester.

Preferably the hard segments are formed entirely from polyethylene terephthalate groups, but they may contain other groups derived from isophthalic acid, adipic acid, sebacic acid, 2,6 - and 2, 7 - naphthoic acids, or mixtures thereof. The hard segments may also comprise a block copolymer of polyethylene and polybutylene terephthalate. Where the elastomeric block copolymer is to be used for the production of fibres and tapes, it is desirable that these other groups should not exceed 25 mole percent of the hard segments, but for the Production of cushions, mouldings, gaskets and the like, these other groups may be present up to 50 mole percent of the hard segments.

The soft segments may be formed by condensing ethylene oxide, propylene oxide and/oz 1, 2 butylene oxide, eIther separately and sequentially or as a mixture, with a dihydroxyphenol, for example resorcinol, or a bisphenol. Suitable bisphenols include the group having the structure

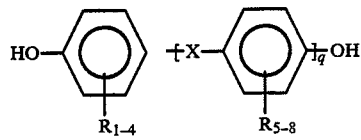

where
represents a direct link between the phenyl groups,

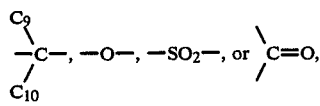

$R_{1-8}$ represent —H, —$CH_3$, —$C_2H_5$, or —$C_3H_7$,
$R_{9-10}$ represent —H, —$CH_3$, —$C_2H_5$, — $C_3H_7$,

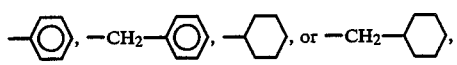

q represents an integer selected from 1, 2, and 3.

The ratios of ethylene oxide to propylene oxide and butylene oxide which are reacted with the dihydroxy phenol or bisphenol should be carefully controlled. Thus, if the amount of ethylene oxide is excessively high, the elastic Properties are impaired. Furthermore, the segment tends to crystallise on stretching, again impairing the elastic properties. On the other hand, the amounts of propylene oxide or butylene oxide used should not be too high, otherwise the thermal stability of the segment becomes unacceptable. For example we have found that for the optimum properties, the ratio of ethylene oxide to propylene oxide and butylene oxide condensed onto the dihydroxyphenol or bisphenol should be within the range 10:1 to 1:20.

It has been found that the melting point of the block copolymer increases with an increase in the molecular weight of the soft section, but decreases with an increase in the weight percent of the soft segment present. Consequently it is advisable that the total amount of ethylene oxide, propylene oxide and butylene oxide which is combined with the dihydroxyphenol or bisphenol group is such that the resulting product has a molecular weight of at least 500 and preferably at least 1,000 but no greater than 10,000. Condensation products having a molecular weight of 1,000 to 5,000 are eminently suitable. Enabling the production of block copolymers having a high weight percent of soft segments and also a relatively high melting temperature.

The elastic and work recoveries of fibres melt spun from the copolyesters increases with the weight percent of the soft segments. Hence to achieve acceptable recovery properties, the soft segments must comprise at least 40 weight percent of the copolyester. Elastic recovery values above 90% for the first stretching cycle and around 100% for the fourth stretching cycle are normally obtained when the soft segment comprises at least 55 weight percent of the copolyester. Similarly, work recovery values of at least 20% for the first stretching cycle and at least 90% for the fourth stretching cycle are often achieved when the soft segment comprises at least 45 weight percent of the copolyester.

The elastomeric block copolymers of the present invention are very suitable for converting into tapes, and especially fibres, by melt extrusion using conventional methods. In addition, it has been found that the tackiness observed with yarns spun at low speed decreases with an increase in wind up speed, and those spun in excess of 1 km/min are almost tack-free.

Therefore, according to another aspect of the present invention there is provided a process for the production of an elastomeric fibre in which a block copolyester comprising at least 40 weight percent of soft segments and no more than 60 weight percent of hard segments is melt spun and the resulting fibre is wound up at a speed of at least 1 km per minute, the block copolyester having hard segments comprising at least mole percent of polyethylene terephthalate groups and soft segments which have the structure

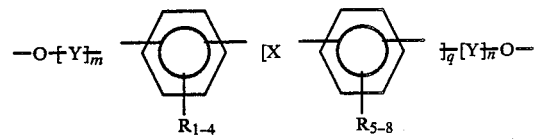

where
(i) X represents a direct link between the phenyl groups,

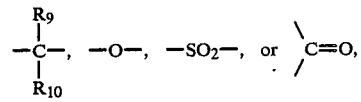

(ii) Y represents a combination of —[—$CH_2$—$CH_2$—O—]— (I) with

 (II)

and/or

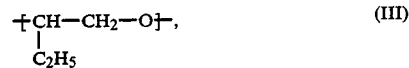 (III)

the ratio of
(I) to (II) +(III) being within the range 10:1 and 1:20,
(iii) m and n each represent an integer, the sum of which corresponds to the segment having a molecular weight of 500 to 10,000,
(iv) $R_{1-8}$ each represent —H, — $CH_3$, —$C_2H_5$, or —$C_3H_7$,
(v) $R_{9-10}$ each represent —H, —$CH_3$ —$C_2H_5$, —$C_3H_7$, —⌬, —$CH_2$—⌬, —⬡, or —$CH_2$—⬡, and (vi) q represents an integer selected from 0, 1, 2 and 3.

Problems arising from any tackiness shown by the melt spun fibres may be reduced or even eliminated by applying a spin finish to them before being wound up. The spin finish may be applied by any suitable conventional means, for instance the fibres may be passed through a bath of spin finish or over a lick roll coated with spin finish, or across a metered spin finish applicator.

The properties of the melt spun fibres, especially the work recovery, may be improved by subjecting them to a hot relaxation treatment, especially a dynamic relaxation treatment. The latter type of treatment increases breaking extension and improves the work recovery after extension cycling to 100%. The degree of improvement of the properties of the fibres is a function of the temperature at which relaxation takes place.

Therefore, according to a further aspect of the present invention there is provided a process for the production of an elastomeric fibre from a block copolyester having hard and soft segments in which the hard segments comprise at least 70 mole percent of polyethylene terephthalate groups, and the soft segments comprise at least 40 weight percent of the block copolyester and have the structure

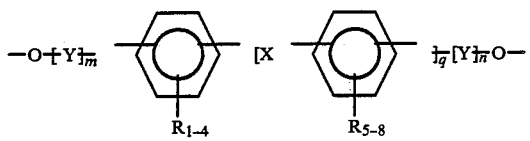

where
(i) X represents a direct link between the phenyl groups,

and/or

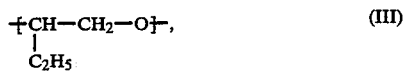

(ii) Y represents a combination of $-[-CH_2-CH_2-O-]-$ (I) with
the ratio of

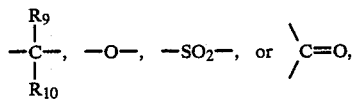

(I) to (II) + (III) being within the range 10:1 and 1:20,
(iii) m and n each represent an integer, the sum of which corresponds to the segment having a molecular weight of 500 to 10,000,
(iv) $R_{1-8}$ each represent $-H$, $-CH_3$, $-C_2H_5$, or $-C_3H_7$,
(v) $R_{9-10}$ each represent $-H$, $-CH_3$ $-C_2H_5$, $-C_3H_7$,

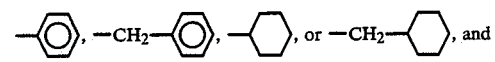

(vi) q represents an integer selected from 0, 1, 2 and 3, the process comprising melt spinning the block copolyester and winding up the resulting fibre at a speed of at least 1 km per minute, and subjecting the spun fibre to a hot relaxation at a temperature within the range 50 to 220° C. Preferably the hot relaxation is performed continuously, for example by passing the fibre over a feed roll assembly, then over a heated plate or through a heated tube, and finally over an output roll assembly before being wound up or further processed. The output roll assembly operates at a slower speed than the feed roll assembly, the difference in speed being that necessary to produce the desired degree of relaxation. Preferably the temperature of the source of heat is adjusted so that the fibres are heated to a temperature within the range 75 to 200° C. It has been found that temperatures of the order of 150° C. are very suitable for improving the properties of the fibres.

In order to increase the thermal stability of the block copolyesters of this invention a conventional antioxidant may be added. The antioxidant may be added at any convenient time during the manufacture of the polymer or the fibres, or after the production of the fibres, e.g. during the preparation of the soft or hard segments, during the reaction between the two types of segments, or it may be applied as a solution to the spun fibres. Other additives, e.g. light stabilisers, colourants, and delustering agents may be similarly added.

The invention will be further illustrated by reference to the following examples.

Preparation of Soft Segment Components

The soft segments of the block copolyesters of the examples were prepared using the following general method.

The dihydric aromatic compound was charged to the reactor under nitrogen. Sufficient alkali, e.g. potassium or sodium hydroxide or methoxide, to give a final concentration of 0.1% to 0.25% w/w on product was then added and the reactor was stirred and heated to 140° C. whilst a vacuum was applied for 30 minutes. The reactor was then pressured with nitrogen to a pressure of 2.5 Bars and alkylene oxide admitted to give a total pressure of 4.5 Bars. The reaction temperature was controlled between 100° C. and 140° C. whilst the reaction took place, further alkylene oxide being added to maintain the total pressure above 2.5 bars. When the required weight of alkylene oxide had been added and fully reacted, a vacuum was applied to remove traces of volatile material and a neutralising acid, e.g. acetic, phosphoric and adipic acid, was added. Optionally the product was then treated with magnesium silicate e.g. "AMBOSOL" (Nobel Hoechst Chemie) at 110° C. 120° C. and filtered to remove catalyst residues. Prior to discharge "IRGANOX" (Ciba Geigy Ltd.) 1010 or 1330 hindered phenol type antioxidant was added. For dihydric aromatic compounds of melting points above 140° C. a solvent or inert carrier liquid may first be charged to the reactor.

Preparation of Polymer

The method used to prepare the block copolyesters is illustrated by reference to that used for the preparation of polymer containing 65% of alkoxylate F of examples 21 to 24.

2.37 kg of a low molecular weight polyester formed by the reaction of terephthalic acid and ethylene glycol (1:1.4 TA:EG), 3.9 kg of alkoxylate F (cf Table 1) (molecular weight 1900), 12 g (0.20%) of triphenylphosphite and 15 g (0.25%) ..of the antioxidant hindered phenol type sold by Ciba Geigy Ltd. under the name "IRGANOX" 1010, were charged into a reaction vessel at 200° C. The temperature was raised to 240° C. and the low molecular weight polyester allowed to melt under nitrogen. Then 3 g (0.05) of antimony trioxide as a 10% slurry in ethylene glycol were introduced into the reaction mixture.

The mixture was then stirred and heated under nitrogen to a temperature of 270° C. The vessel pressure was gradually reduced whilst heating, and polycondensation of the resulting product was conducted under a vacuum of less than 1 mm mercury for 3 hours. The clear white polymer obtained had a melting point of 190° C. and an IV of 0.89.

Fibre Spinning

The method used for the preparation of fibres from the block copolyesters is illustrated by reference to that used for the preparation of fibres of Examples 21 to 24.

Dried polymer chip containing 65% of alkoxylate F of Table I, was melted in a screw extruder, whose temperatures were set at 146° C. (feed section), rising to 203° C. (extrusion), the molten polymer was then passed through a filter bed of 30 g of 30 grade alumina and 10 g of 60 grade alumina, and finally extruded at a rate of 5.1 g/minute through a spinneret with 7 holes of 380 μ diameter. The yarn was passed through an air-quench zone, over a spin finish applicator, where it was lubricated with about 5% of a silicone based finish, and wound up at 1.5 km/min. The resulting yarn was not tacky and had the properties given in Table 2, Cell 22.

Tape Spinning and Drawing

The method used for the preparation of tape iron the block copolyesters is illustrated by reference to that used for the preparation of tapes of Example 29 from the polymers used in Examples 18 to 20.

The polymer chip containing 65% of alkoxylate C of Table I, was melted in a screw extruder, whose temperatures were set at 150° C. (feed section), rising to 203° C. (extrusion), the molten polymer was passed through a filter bed of 40 g of 30 grade alumina, and finally extruded at a rate of 1.5 g/min through a spinneret with a 0.25 mm × 10 mm slot. The tape was passed through an air quench zone, and was then wound up at 1 m/minute. It was finally drawn six fold at 6 m/minute and then allowed to relax by winding it at a final speed of 2 m/minute. The properties of this tape are given in Table 4.

Test Methods

Melting Point

Samples of about 10 mgs of chip were heated under nitrogen in a Perkin-Elmer Differential Scanning Calorimeter (Series 7) to raise the temperature by 20° C. per minute. The quoted melting point is the peak of the melting endotherm.

Intrinsic Viscosity

The flow times for 0.1 –0.5 wt % solutions of polymer chip in phenol/tetrachloroethane (40/60 w/w) at 25° C. were compared to that of the pure solvent, and the viscosity calculated in the normal manner.

Tenacity and Extension

The sample of yarn was first allowed to equilibrate overnight in a standard atmosphere (65 ± 2% RH and 20 ± 2° C.), and then it was placed between the jaws of an Instron Tensile Tester (Model TM-M), set with a 5 cm gap. The sample was extended at a rate of 25 cm/min till it broke, and the results calculated from a calibrated chart running at 50 cm/min.

Elastic and Work Recovery

The sample of yarn was conditioned as above and tested with similar Instron settings. When it had been extended by 100%, the Instron cross-head automatically reversed and returned to its starting position. After a 30 second delay, the procedure was repeated three times. Only the results from the first and fourth cycles are quoted in the Tables.

Elastic Recovery =

$$\frac{\text{Yarn retraction on returning to zero stress}}{\text{Applied extension}} \times 100\%$$

$$\text{Work Recovery} = \frac{\text{Work recovered in unloading time}}{\text{Work done in loading time}} \times 100\%$$

The elastic recovery was obtained by direct measurement along the extension axis of the chart, while the work recovery was obtained by weighing the areas under the curves. The slack in the yarn after the first and subsequent cycles was not taken up before retesting. Thus the yarn was not stretched the full 100% during the 2nd, 3rd and 4the cycles.

The following examples describe the properties of fibres melt spun from block copolyesters in which the soft segments were derived from the following compounds:

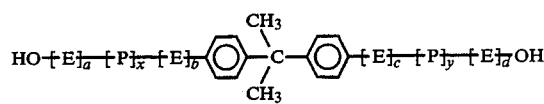

where E represents the $-(CH_2-CH_2-O)-$ group and

P represents the $-(CH-CH_2-O)-$ group
                        |
                       $CH_3$

TABLE 1

| Structural | Alkylene oxide units | | |
|---|---|---|---|
| Reference | (a + d) | (x + y) | (b + c) |
| A | 14 | 3 | 6 |
| B | 10 | 10 | 9 |
| C | 16 | 10 | 9 |
| D | 20 | 3 | 0 |
| E | 19 | 10 | 0 |
| F | 25 | 10 | 0 |

EXAMPLES 1–26

Block copolyesters, whose composition and properties are given in Tables 1 and 2, were melt spun using the general conditions described above, and the properties of the resulting fibres wound up at various speeds are given in Table 2.

TABLE 2

| EXAMPLE | SOFT SEGMENT TYPE | % WT | Tm °C. | IV | WIND UP SPEED KM/MIN | TENACITY CN/TEX | EXTN % | ELASTIC RECOVERY CYCLE 1 | ELASTIC RECOVERY CYCLE 4 | WORK RECOVERY CYCLE 1 | WORK RECOVERY CYCLE 4 |
|---|---|---|---|---|---|---|---|---|---|---|---|
| 1 | A | 40 | 221 | 0.79 | 1.0 | 4.9 | 266 | 76 | 89 | 19 | 67 |

TABLE 2-continued

| EXAMPLE | SOFT SEGMENT TYPE | SOFT SEGMENT % WT | Tm °C. | IV | WIND UP SPEED KM/MIN | TENACITY CN/TEX | EXTN % | ELASTIC RECOVERY CYCLE 1 | ELASTIC RECOVERY CYCLE 4 | WORK RECOVERY CYCLE 1 | WORK RECOVERY CYCLE 4 |
|---|---|---|---|---|---|---|---|---|---|---|---|
| 2 | | | | | 2.0 | 8.2 | 164 | 72 | 89 | 14 | 71 |
| 3 | A | 45 | 212 | 0.85 | 1.0 | 4.8 | 319 | 84 | 92 | 24 | 73 |
| 4 | A | 50 | 206 | 0.86 | 1.0 | 5.4 | 248 | 85 | 97 | 25 | 77 |
| 5 | A | 55 | 196 | 0.76 | 1.0 | 4.9 | 179 | 88 | 99 | 19 | 88 |
| 6 | B | 50 | 217 | 0.78 | 1.0 | 4.0 | 282 | 88 | 96 | 30 | 77 |
| 7 | | | | | 2.0 | 9.6 | 120 | 86 | 97 | — | — |
| 8 | C | 50 | 222 | 0.92 | 1.0 | 6.3 | 272 | 85 | 98 | 24 | 78 |
| 9 | | | | | 2.0 | 7.6 | 141 | 84 | 97 | 17 | 79 |
| 10 | C | 55 | 213 | 0.85 | 1.0 | 4.9 | 322 | 90 | 99 | 24 | 80 |
| 11 | | | | | 2.0 | 7.4 | 119 | 89 | 97 | 16 | 79 |
| 12 | C | 60 | 205 | 0.96 | 1.0 | 4.6 | 270 | 93 | 100 | 25 | 84 |
| 13 | | | | | 2.0 | 7.2 | 140 | 93 | 100 | 20 | 91 |
| 14 | E | 50 | 214 | 0.95 | 1.0 | 8.0 | 295 | — | — | — | — |
| 15 | | | | | 1.5 | 10.1 | 237 | 82 | 97 | 17 | 80 |
| 16 | F | 50 | 220 | 0.93 | 1.0 | 5.0 | 291 | — | — | — | — |
| 17 | | | | | 1.5 | 9.1 | 226 | 86 | 99 | 22 | 86 |
| 18 | C | 65 | 190 | 0.84 | 1.0 | 3.2 | 174 | 90 | 112 | 27 | 102 |
| 19 | | | | | 1.5 | 4.5 | 136 | 94 | 115 | 21 | 96 |
| 20 | | | | | 2.0 | 5.5 | 99 | 92 | 122 | 20 | 109 |
| 21 | F | 65 | 190 | 0.89 | 1.0 | 5.7 | 240 | 94 | 109 | 21 | 100 |
| 22 | | | | | 1.5 | 7.0 | 207 | 94 | 106 | 22 | 99 |
| 23 | | | | | 2.0 | 9.7 | 165 | 97 | 106 | 20 | 95 |
| 24 | | | | | 3.0 | 11.3 | 124 | 90 | 111 | 24 | 106 |
| 25 | C | 67 | 180 | 0.92 | 1.0 | — | — | 93 | 100 | 27 | 89 |
| 26 | | 65 | 189 | 0.96 | 0.25 | — | — | 94 | 99 | 26 | 90 |

EXAMPLES 27-28

Elastomeric fibres were produced by melt spinning the polymer used for Examples 18-20 and winding up the fibres at a speed of 2 km per min. They were then heat relaxed by passing them over a drawing machine comprising a hot plate located between a feed roll assembly and a draw roll assembly. The former was run at a speed o: 3 metres per minute and the latter at Z metres per minute, i.e. the fibres were allowed to relax approximately 33%. The properties of the resulting fibres are given in Table 3.

TABLE 3

| Example | Relaxation Temperature (°C.) | Breaking Extension (%) | Elastic Recovery (%) Cycle 1 | Elastic Recovery (%) Cycle 4 | Work Recovery (%) Cycle 1 | Work Recovery (%) Cycle 4 |
|---|---|---|---|---|---|---|
| 27 | — | 99 | 92 | 122 | 20 | 109 |
| 28 | 100 | 265 | 85 | 95 | 45 | 95 |

EXAMPLE 29

The properties of the tape produced by spinning, drawing, and relaxing at ambient temperature the polymer containing 65% of alkoxylate C of Table I, at a final speed of 2 m/minute are given in Table 4.

TABLE 4

| Tenacity CN/Tex | Extn % | Elastic Recovery Cycle 1 | Elastic Recovery Cycle 4 | Work Recovery Cycle 1 | Work Recovery Cycle 4 |
|---|---|---|---|---|---|
| 1.7 | 434 | 92 | 99 | 66 | 90 |

The following examples describe the properties of fibres melt spun from block copolyesters in which the segments were derived from the following:

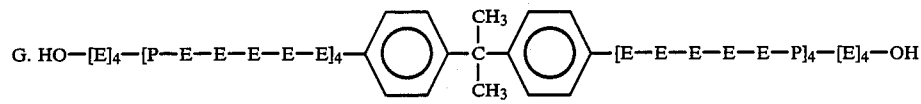

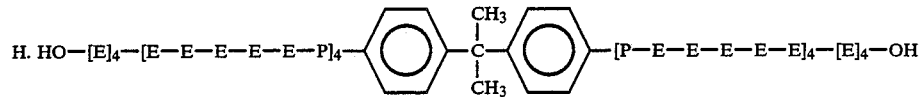

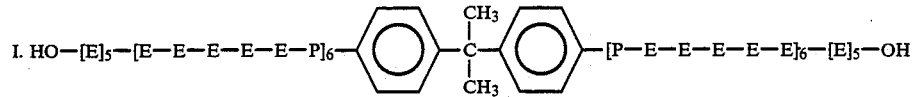

J. HO—[E]₅—[E—E—E—E—E—P]₂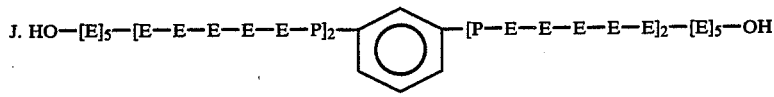[P—E—E—E—E—E]₂—[E]₅—OH where E represents $\text{-(CH}_2\text{—CH}_2\text{—O)-}$ and P represents $\text{-(CH—CH}_2\text{—O)-}$
                                                                              |
                                                                              CH₃

The elastomeric polymers were prepared and melt spun using the general conditions previously described, and their properties are given in Table 3.

TABLE 3

| Example | Soft Segment Type | Soft Segment % Wt | Tm °C. | Wind-up Speed Km/min | Tenacity CN/TEX | Extension % | Elastic Recovery C1 | Elastic Recovery C4 | Work Recovery C1 | Work Recovery C4 |
|---|---|---|---|---|---|---|---|---|---|---|
| 30 | G | 65 | 213 | 1.5 | 3.4 | 188 | 93 | 107 | 21 | 91 |
| 31 | H | 65 | 209 | 1.5 | 5.4 | 177 | 91 | 105 | 24 | 91 |
| 32 |   |   |     | 2.0 | 8.0 | 126 | 100 | 108 | 24 | 89 |
| 33 | I | 65 | 221 | 1.5 | 7.1 | 134 | 93 | 104 | 22 | 88 |
| 34 |   |   |     | 2.0 | 6.2 | 143 | 97 | 107 | 19 | 91 |
| 35 | J | 65 | 183 | 1.5 | 2.9 | 128 | 94 | 108 | 20 | 89 |

We claim:

1. A process for the production of an elastomeric fibre in which a block copolyester comprising at least 40 weight percent of soft segments and no more than 60 weight percent of hard segments is melt spun and the resulting fibre is wound up at a speed of at least 1 km per minute, the block copolyester having hard segments comprising at least 70 mole percent of polyethylene terephthalate group and soft segments which have the structure

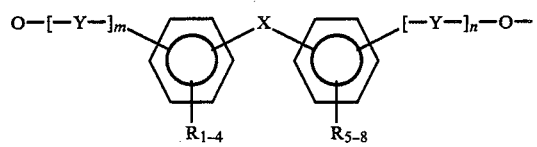

or

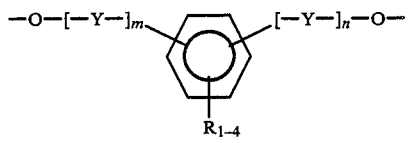

where
(i) X represents a direct link between the phenyl groups,

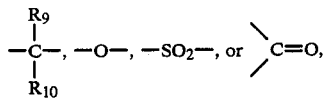

(ii) Y represents a combination of —[—CH₂—CH₂—O—]— (I) with $$-[\text{CH}-\text{CH}_2-\text{O}-] \quad\quad (II)$$
$$\quad\quad\quad | $$
$$\quad\quad\quad \text{CH}_3$$

and/or $$-[-\text{CH}-\text{CH}_2-\text{O}-], \quad\quad (III)$$
$$\quad\quad | $$
$$\quad\quad \text{C}_2\text{H}_5$$

the ratio of (I) to (II) + (III) being within the range 10:1 and 1:20, (iii) m and n each represent an integer, the sum of which corresponds to the segment having a molecular eight of 500 to 10,000, (iv) R₁₋₈ each represent —H, —CH₃, —C₂H₅, or —C₃H₇, and (v) R₉₋₁₀ each represent —H, —CH₃, C₂H₅, C₃H₇,

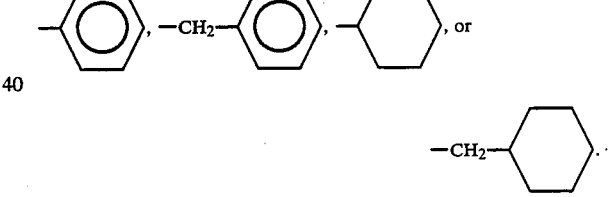

2. A process for the production of an elastomeric fibre from a block copolyester having hard and soft segments in which the hard segments comprise at least 70 mole percent of polyethylene terephthalate groups, and the soft segments comprise at least 40 weight percent of the block copolyester and have the structure

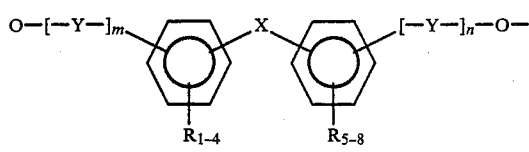

or

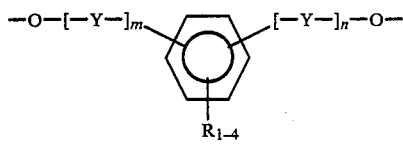

where (i) X represents a direct link between the phenyl groups,

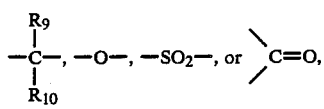

(ii) Y represents a combination of —[—CH$_2$—CH$_2$—O—]— (I) with

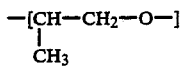

and/or

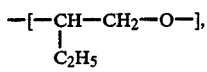

the ratio of (I) to (II) + (III) being within the range 10:1 and 1:20, (iii) m and n each represent an integer, the sum of which corresponds to the segment having a molecular weight of 500 to 10,000, (iv) R$_{1-8}$ each represent —H, —CH$_3$, —C$_2$H$_5$, or —C$_3$H$_7$, and R$_{9-10}$ each represent —H, —CH$_3$, C$_2$H$_5$, C$_3$H$_7$,

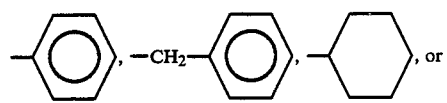

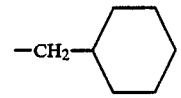

the process comprising melt spinning the block copolyester and winding up the resulting fibre at a speed of at least 1 km per minute, and subjecting the spun fibre to a hot relaxation at a temperature within the range 50 to 220° C.

3. A process according to claim 2 wherein the spun fibre is subjected to a continuous to relaxation process at a temperature within the range 75 to 200° C.

4. An elastomeric fibre produced according to the process of any one of claims 3, 1 and 1.

* * * * *